J. C. GROVES.
HEN'S NEST.
APPLICATION FILED JULY 1, 1920.

1,399,614.

Patented Dec. 6, 1921.
2 SHEETS—SHEET 1.

Inventor
Joab C. Groves

By Franklin N. Hough
Attorney

J. C. GROVES.
HEN'S NEST.
APPLICATION FILED JULY 1, 1920.
1,399,614.
Patented Dec. 6, 1921.
2 SHEETS—SHEET 2.
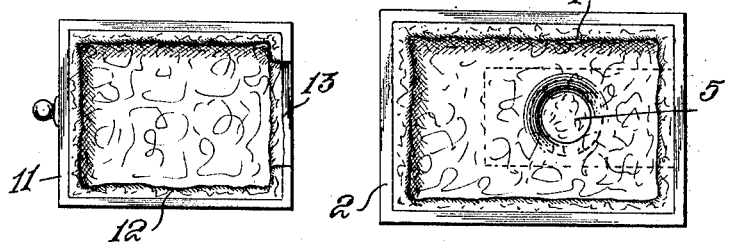
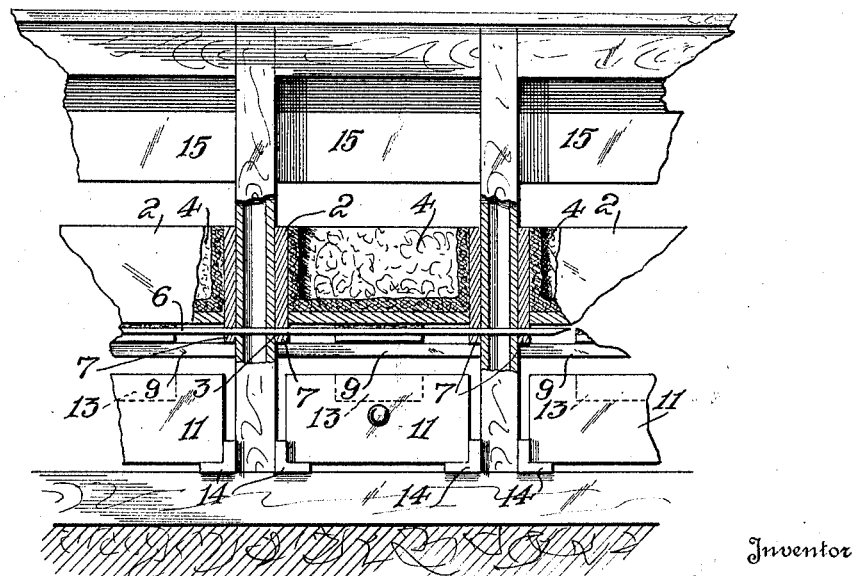
Inventor
Joab C. Groves
By Franklin H. Hough
Attorney

UNITED STATES PATENT OFFICE.

JOAB C. GROVES, OF VALLEY POINT, WEST VIRGINIA.

HEN'S NEST.

1,399,614.                Specification of Letters Patent.        Patented Dec. 6, 1921.

Application filed July 1, 1920. Serial No. 393,300.

*To all whom it may concern:*

Be it known that I, JOAB C. GROVES, a citizen of the United States, residing at Valley Point, in the county of Preston and State of West Virginia, have invented certain new and useful Improvements in Hens' Nests; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to animal husbandry and particularly to hen nests.

An object of this invention is to provide a nest which will automatically deliver an egg to a drawer beneath said nest, upon the exit of a fowl from said nest and further to provide an improved nest and receptacle drawer below said nest and to provide an improved means of delivery of an egg from the nest to the receptacle below the nest and further to provide for an improved automatic operation of the nest by the weight of the fowl entering the nest or going from the nest.

With these and other objects in view, the invention consists in the construction, the combination, the detail and arrangement of parts as hereinafter more fully described and claimed.

In the drawings.

Fig. 2 is a plan view of a single nest.

Fig. 3 is a plan view of the drawer beneath the nest,

Fig. 4 is a fragmentary front view, part in section and part in elevation of a plurality of nests arranged side by side.

Figure 1:
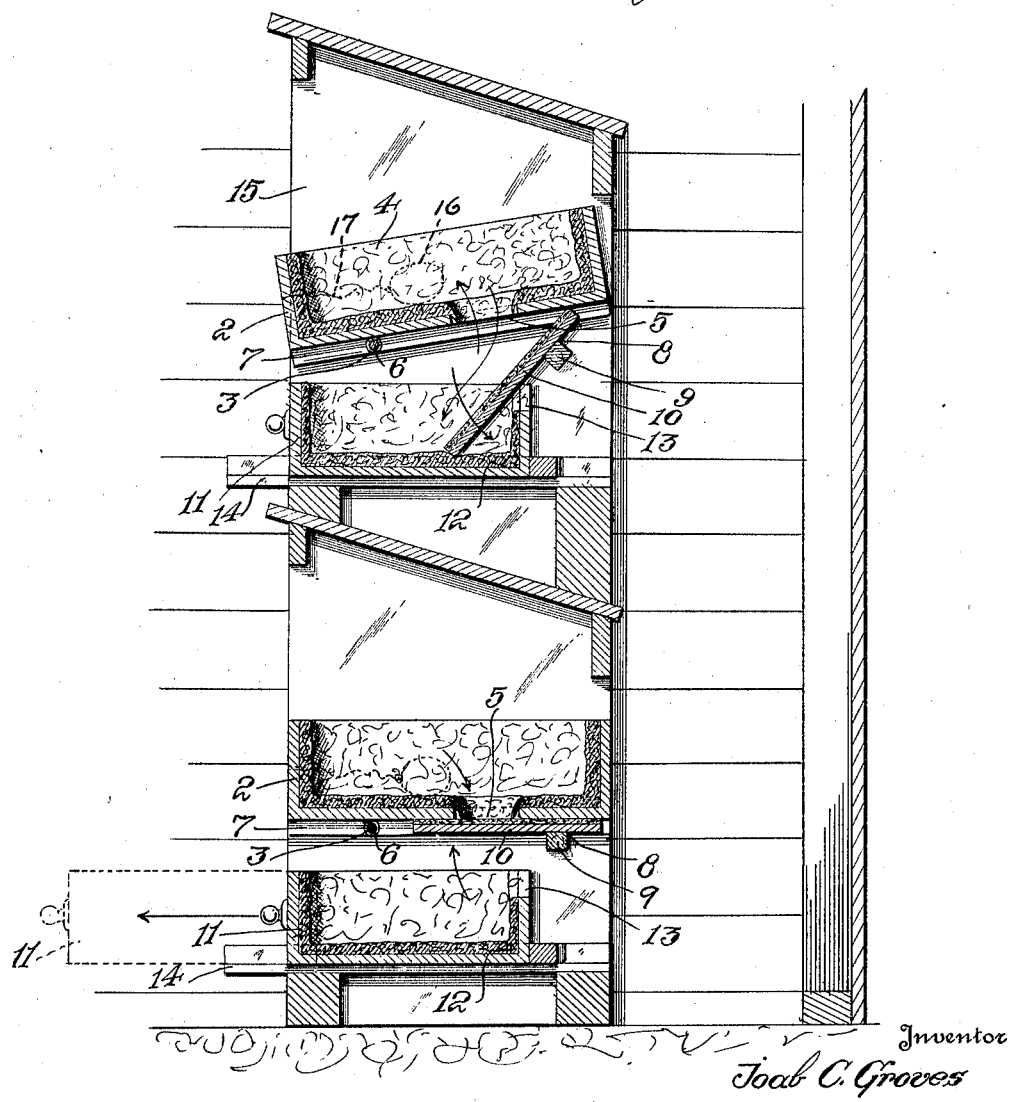
Figure 1 is a longitudinal sectional view through a plurality of my nests, showing also a fragmentary view, part in section and part in elevation of the coop in which the nests are contained.

In the embodiment of my invention, there is provided a rectangular nest box 2, pivoted at 3 and cushioned and provided with suitable nesting material 4 and perforated at 5, the said pivotal mount including a pivot pin 6 extending transversely underneath the floor of the nest and through depending flanges 7. Pivotally mounted beneath the nest in a predetermined position is a closure 8 pivoted at 9 and also provided with a cushion 10. Slidably mounted beneath the said closure 8 is a drawer 11, also provided with a cushion material 12 and provided with a recess 13 at its rear and suitably spaced and positioned relative to said nest box and said closure 8 so that the forward end of said closure, when the same is downward, will rest upon the bottom of the said sliding box and clear the same by the slot 13. The said closure 8, by reason of its pivot, will when the said nest is lowered at the front, swing downwardly until its forward edge strikes the bottom of the egg box which, at its predetermined position forms an incline of proper angularity to cause the egg to roll downward upon the said incline into the said box without any undue velocity such as would cause the rupture of the egg. The nest box is moved upon its pivot by the weight of the hen upon the forward part or the box, which lifts the rearward part of the box, causing the front of said closure 8 to gravitate and thereby removing said closure 8 from its normal position of closing the hole 5 in the said nest box, the normal position of the nest box being shown in the lower part of Fig. 1 and the position of the relative parts when the said nest box is subjected to the weight of a hen at the forward part being shown in the upper part of Fig. 1. The said drawer 11 is slidable upon a track-way 14, which extends in a projecting lip beyond the forepart of the standard or frame 15.

As there is a belief prevalent that hens may be induced to lay eggs by equipping the nests by so called "nest eggs," provision is made herein for a nest egg indicated at Fig. 1 as 16, provision also being made for maintaining the nest egg in the receptacle 2 without passing through the opening 5, by the employment of a cord 17 by which the movement of the nest egg 16 is restrained.

In operation with the parts disposed as shown at the top in Fig. 1, a hen entering the nest will naturally alight at first upon the front edge. Stepping down into the bottom of the nest will cause the nest to be depressed from the elevated or inclined position, as shown at the top, to the horizontal position, as shown at the bottom of said figure. With the nest in this position, the hen will perform her usual function of laying an egg. This egg will pass into the opening 5 because of its depression. While no inclination has been shown in the bottom of the nest for the purpose of guiding the egg to this opening, such inclination is, of course, within the scope of the present invention, but is not essential as the movement of the hen within the nest will surely deposit the egg within said depression. When the hen leaves the nest she first alights upon the forward edge of the nest. It is well known that a hen will never fly over an obstruction. A hen will fly upon an obstruction and from such obstruction to some other position. In the present case the hen will first, therefore, alight upon the forward edge of the nest, which will tilt the nest to the position shown at the top in Fig. 1, whereby the egg which is then within the depression 5 and resting upon the hinged member 10, will roll down the incline into the drawer 11. This completes the operation of the hen. The remaining operation is manual, which may be by the withdrawal of the drawer 11 which returns the nest to horizontal position, as shown in the lower part at Fig. 1. It does not, however, prevent the nest being again used by the same or another hen in the same manner, in which case it will be reasonable to expect to find two eggs in the drawer.

What I claim is:

1. In a nesting device, a nest container perforated at the bottom and pivotally mounted forward of said perforation, a closure for said perforation pivotally mounted rearward thereof in such a position and relation as to cause the said closure to form an incline for the delivery of eggs from said nest receptacle upon a predetermined downward movement of the forward part of said nest box upon said pivot.

2. A nesting device comprising a box pivoted to swing upon a horizontal axis, a closure pivoted beneath the box to swing upon a horizontal axis, said box being provided with an opening discharging upon the closure, and a sliding drawer beneath the box, adapted when actuated to return the closure to normality.

3. A nesting device comprising a box having an opening in the bottom and hinged beneath adjacent the forward edge, a closure member hinged beneath the box, and adapted to close the opening when in normal position, the said box resting upon the closure at the rear of its hinging, and a sliding drawer positioned to receive the depressed end of the closure and to return the closure to normality when the drawer is actuated.

In testimony whereof I hereunto affix my signature.

JOAB X C. GROVES.
his mark

Attest:
E. J. GROVES,
J. SMITH.